US008386280B2

(12) United States Patent
Mathai et al.

(10) Patent No.: US 8,386,280 B2
(45) Date of Patent: *Feb. 26, 2013

(54) SPATIAL DATABASE SYSTEM FOR GENERATION OF WEATHER EVENT AND RISK REPORTS

(75) Inventors: Shajy Mathai, Chester, NJ (US); Bryan Adams, Pompton Plains, NJ (US); Kiran Andaloo, Jersey City, NJ (US); John Mangano, Melbourne Beach, FL (US); Shaju Samuel, Paramus, NJ (US); Elizabeth Soh, Leonia, NJ (US)

(73) Assignee: Guy Carpenter & Company, LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/108,559

(22) Filed: May 16, 2011

(65) Prior Publication Data
US 2011/0218828 A1 Sep. 8, 2011

Related U.S. Application Data

(63) Continuation of application No. 11/715,159, filed on Mar. 7, 2007, now Pat. No. 7,949,548.

(60) Provisional application No. 60/780,110, filed on Mar. 8, 2006.

(51) Int. Cl.
*G06Q 10/00* (2012.01)
*G06Q 40/00* (2012.01)
(52) U.S. Cl. ............................... 705/4; 705/35
(58) Field of Classification Search .................. 705/4
See application file for complete search history.

(56) References Cited

U.S. PATENT DOCUMENTS

| 4,766,539 A | 8/1988 | Fox |
| 4,975,840 A | 12/1990 | Detore et al. |
| 5,630,127 A | 5/1997 | Moore et al. |
| 5,832,456 A | 11/1998 | Fox et al. |
| 5,839,113 A | 11/1998 | Federau et al. |

(Continued)

FOREIGN PATENT DOCUMENTS

| JP | 83 329 043 | 12/1996 |
| JP | 10 161 993 | 6/1998 |

(Continued)

OTHER PUBLICATIONS

Sznaider, Solving Complex Problems with GIS and Advanced Meteorological Data, Feb. 11, 2003, Presented at the 19th International Conference on Interactive Information Processing Systems (IIPS) for Meteorology, Oceanography, and Hydrology.*

(Continued)

*Primary Examiner* — Tran Nguyen
(74) *Attorney, Agent, or Firm* — Fay Kaplun & Marcin, LLP

(57) ABSTRACT

The present invention is a tool including a spatial database and a data warehouse used to track portfolio sites that are affected by weather events, such as hurricanes, earthquakes, wildfires, hail, tornados, or manmade events. A spatial database provides rich spatial geometry features using earth longitude and latitude as a 2-D reference system in spatial system. A insurer portfolio site, which is defined by longitude and latitude data, includes portions that are represented as a point. A weather event is represented as polygon in the spatial database. Based on user configured threshold values, it may be determined when a point falls inside, or on a boundary, of a polygon to identify a site that is affected by that weather event and corresponding reports may be generated, including maps identifying the affected sites and total insured value calculations for the affected sites, in order to gauge risk.

21 Claims, 11 Drawing Sheets

U.S. PATENT DOCUMENTS

| | | | |
|---|---|---|---|
| 5,897,619 A * | 4/1999 | Hargrove et al. | 705/4 |
| 6,021,402 A | 2/2000 | Takriti | |
| 6,186,793 B1 | 2/2001 | Brubaker | |
| 6,336,096 B1 | 1/2002 | Jernberg | |
| 6,405,179 B1 | 6/2002 | Rebane | |
| 6,418,417 B1 | 7/2002 | Corby et al. | |
| 6,670,908 B2 | 12/2003 | Wilson et al. | |
| 6,912,521 B2 | 6/2005 | Kraft et al. | |
| 6,963,853 B1 | 11/2005 | Smith | |
| 6,995,675 B2 | 2/2006 | Curkendall et al. | |
| 7,949,548 B2 * | 5/2011 | Mathai et al. | 705/4 |
| 2006/0136273 A1 * | 6/2006 | Zizzamia et al. | 705/4 |

FOREIGN PATENT DOCUMENTS

| | | |
|---|---|---|
| JP | 2003 18 7366 | 7/2003 |
| JP | 2004 26 5223 | 9/2004 |
| WO | WO2006013100 * | 12/2006 |

OTHER PUBLICATIONS

News Release, Guy Carpenter Launches Catastrophe Mapping Tool to Assess Katrina Losses, New York, Sep. 28, 2005.

Press Release, Benfield Inc. Launches Single Risk ModelingSM, www.benfieldgroup.com/media, Oct. 12, 2007.

Towers Perrin, Master the Art and Science of Catastrophe Rish Management with CATography™, www.towersperrin.com/tp/show, Nov. 2009.

Arnoldo Frigessi, Weather events and insurance claims: a Bayesian spatial variable selection model., Nov. 11, 2009.

Pitney Bowes Business Insight, Risk Data Suite, Extensive peril data sets for mission-critical insurance analysis and decision-making, 2009.

MapInfo Introduces Weather and Natural Hazards Data Sets for Insurance Solution., www.thefreelibrary.com, Troy, New York—(Business Wire)—Sep. 23, 2003.

Julien Iris, Jerome Chemitte & Aldo Napoli, A Geospatial Web Platform for Natural Hazard Exposure Assessment in the Insurance Sector, www.springerlink.com, Feb. 28, 2009.

Executive Summary for Southern California Oct. 2007 Wildfires~Update #5, Benfield, ReMetrics—Catastrophe Modeling, Updated: Oct. 27, 2007.

Roman Hohl, Hans-Heinrich Schiesser & Ingeborg Knepper, The use of weather radars to estimate hail damage to automobiles: an exploratory study in Switzerland, Atmospheric Research 61 (2002) 215-238.

Khanduri, Vulnerability of buildings to windstorms and insurance loss estimation, 2003, Journal of Wind Engineering and Industrial Aerodynamics, 91, 455-467.

Getz, A Survey of New Jersey's Agricultural Weather Service Users, vol. 59, Issue 10 (Oct. 1978), Bulletin of the American Meteorological Society Article: pp. 1297-1304.

* cited by examiner

SPATIAL DATABASE SYSTEM FOR GENERATION OF WEATHER EVENT AND RISK REPORTS

CROSS-REFERENCE TO RELATED APPLICATIONS

This application claims priority as a continuation application to U.S. patent application Ser. No. 11/715,159, filed Mar. 7, 2007 now U.S. Pat. No. 7,949,548, which claims priority to U.S. Provisional Patent Application Ser. No. 60/780,110, filed Mar. 8, 2006.

The present application pertains to a system for generating weather event reports and risk reports including a spatial database containing insurer portfolio data and boundary information and a data warehouse to store the portfolio data.

BACKGROUND

In the present world, insurance companies want to know how much of their Total Insured Value (TIV) is exposed and how their TIV will be affected by weather related catastrophes, like earthquakes, hurricanes, tornados or wildfires or in response to manmade events typically relayed over newswire. Traditionally, they measure the exposure affected by any weather related event only after their insurers begin to file claims. In order to extrapolate individual claims to TIV usually takes a lot of analytical work to be done per individual weather event, and results are only available after few days. A system that provides an industry standard framework to automate weather related catastrophe exposure analysis quickly, or in real-time, is desired in the insurance industry.

Systems for rating geographic areas based on severity and frequency of meteorologic data are known for analyzing meteorological conditions. Such systems are known for combining meteorologic data with a rating chart to show the insurability of a structure located in a geographic area. These systems may use an information screen that identifies a cumulative rating factor for a geographic area such as a county. The cumulative rating factor may be used to rank geographic areas. Such systems have been used to show such ranking based on annual data. However, such a system is not capable of providing ranking of expected exposure within minutes or hours after a meteorologic event or based on real-time data.

Other systems are known that provide an automated system and method for processing real-time meteorological data. Warnings may be distributed based on real-time site specific weather information, such as the Safe-T-Net system or real-time local Doppler radar. These systems describe use of threat information that is combined to produce a composite threat field, which is queried and compared to one or more threshold values that are user definable. The composite threat field meeting and/or exceeding one or more of the threshold values can be automatically identified as an area of threat and can be immediately available for graphic display, for automated alert notification or other dissemination. Such systems are not used to interpolate insurance risk data. Thus, such known systems do not combine real-time meteorological data with insurance risk data to generate reports based on user configurable threshold values.

SUMMARY

The present invention includes a system including a spatial database and a data warehouse that combines real-time meteorological and catastrophe data with insurance risk data in order to provide an aggregation of total risk for a portfolio as affected by weather events. Reports are created that may include graphic illustrations on a map and are reported to users based on user configurable threshold values in view of the user's specific portfolio. For example, threshold values including TIV, storm severity and total loss for a user's specific portfolio may be identified. Also, major catastrophic reports can be customized from the system reports and include data for single major events, such as a major water surge, terrorist act or any other perils that are not available real-time, through, updates provided through the present invention.

In an embodiment, the present invention provides for a system for generating weather event reports comprising: (a) a spatial database that includes insurer portfolio data and has a point to graphically represent a portion of the insurer portfolio data, the spatial database including weather data and boundary information, (b) an impact analysis tool for locating the point that falls within the boundary information, and (c) a reporting engine for generating a report that includes mapped weather data and the point affected by the weather data. In an embodiment, the system may further comprise an orchestration tool that sorts the weather data and insurer portfolio data based on a user defined threshold value. The threshold value may include a date range, weather event, geographic area, TIV range or property value that are received by an automatic notification server (ANS) in order to generate a report for the user.

In an embodiment, the system may load the weather data at least once every twenty-four hours and the system may include a mapping engine for mapping the weather data and providing a data warehouse to store the insurer portfolio data. The weather data may include at least tornado, hail, wind, earthquake, water surge, hurricane track, hurricane wind area or hurricane wind path data. Other manmade events such as fires or terrorist attacks may also be mapped. In an embodiment, the system may further comprise an orchestration tool to process user configurable threshold values that assist the mapping engine in preparing the mapped weather data. The spatial database may provide polygons representative of weather data boundary information, and the impact analysis tool matches the insurer portfolio data with the polygons. In an embodiment, the polygons may be converted to weather related latitude and longitude coordinates and matched to insurance data related latitude and longitude coordinates. The insurer portfolio data may be assigned a policy site ID number and the polygon may be assigned a feature ID number, with both stored in a data warehouse. In an embodiment, the weather data may be sporadic real-time data and additional catastrophe data may be processed, including terrorist acts. The insurer portfolio data may include insured dollar values for individual insured properties along with other insurance financial information or other metrics and the report may include display of the dollar values for each point affected by the weather data.

The present invention may also provide for a method of generating integrated data event reports comprising the steps of loading insurer portfolio data with geographic sites into a spatial database, feeding boundary data into the spatial database, using an impact tool to determine which of the geographic sites have been affected by the boundary data and generating a report of the affected geographic sites that identifies risk areas based on the insurer portfolio data.

In an embodiment, the report may be generated from an interne web portal. The insurance portfolio may be loaded by a insurer from the web portal. In an embodiment, a reporting engine is provided that connects to the data warehouse to display the affected sites and insurance metrics (TIV deductible, limit, etc.) in a grid. A user may choose to view a map of the affected sites and request a map server to get the map by providing the unique feature grids of the weather event and portfolio sites stored as a shape file in a spatial database. In an embodiment, the map server may then connect to the spatial database to get spatial information and then generate the map. The map may be passed to the reporting engine in order to display the report. In an embodiment, a insurer may subscribe to the system to receive reports to be transmitted at least daily by the reporting engine. The reporting engine may run all the subscribed reports overnight and may save the results as a cache file. In an embodiment, when a user logs onto the website and runs subscribed reports, it hits the cache file and the report is returned to the user's desktop.

In an embodiment, the boundary data may include severe history, tornado, hail, wind gust, earthquakes, wildfires, hurricanes, precipitation, water surge, fire or terrorist attack data in a geospatial form. Other manmade events may also be reported. The weather data may be collected from various locations and the data may be transformed into polygons and points on the map. The spatial database may use each point to represent an insurance portfolio site and each polygon represents a weather related event. In an embodiment, a weather affected site may be identified when a point is found inside or on the boundary of a polygon. An impact tool may be provided to implement a java application in order to find all the points that are falling within a polygon by using spatial queries. In an embodiment, the spatial query may operate by finding a point in each polygon. The affected sites and events may then be loaded into the data warehouse.

In an embodiment, an automated synchronization tool may be run every week and an impact tool is run for each weather event and may be run every night. A insurer may provide insurance portfolio data to a website in various formats, including flat files, Excel or SQL server database. In an embodiment, the website may clean, transform and load the insurance portfolio data into a data warehouse. Longitude and latitude data may be represented on the portfolio site by using the synchronization tool which could be a java application. In an embodiment, a spatial point may be constructed by using the longitude and latitude data for all inputted portfolio data. The portfolio data along with newly created spatial point information may be loaded into a spatial database.

A further embodiment of the present invention provides for a computer system for processing weather and insurer portfolio data comprising an end user device including a computer-readable signal-bearing medium, a receiving circuit in the medium to receive insurer portfolio data including geographic address data, a transmitting circuit in the medium for transmitting the geographic address data to a processor, a selection circuit in the medium for selecting weather event data and a display circuit in the medium to generate graphic images depicting the matched weather event data and insurer portfolio data in an integrated report.

In an embodiment, the display medium may include logic for determining threshold values to be selected by a user in order to orchestrate the insurer portfolio data. The geographic address may be a point provided by a spatial database and the weather event data may be a polygon and the logic determines when the point is at or within the polygon. In an embodiment, the processor may include a data warehouse, a spatial database and a mapping engine server, interconnected in order to process real-time weather data and correlate the insurer portfolio data. An ANS may be provided that is connected to the data warehouse in order to trigger a reporting engine to display the integrated report. In an embodiment, the geographic address and the weather event data may include latitude and longitude coordinates that are compared to generate a graphical report where the coordinates overlap.

The system reports provide an aggregation of total risk for a portfolio affected by a weather event represented on a grid and map. The system reports may run periodically (e.g., nightly) or on ad hoc basis by the user. Report templates are created for the system and users may subscribe to some or all of the reports. Reports will be run based on user specified risk thresholds (TIV, storm severity, total loss, etc.) for a user specific portfolio. Users are responsible for setting the thresholds through saving assigned values to one or more "prompts" within the report template. For the nightly runs of the reports, the report result (document) will be saved and e-mailed directly to the user. Users may run a report at any time through a business intelligence reporting engine interface and may optionally change the values assigned to one or more prompts.

The system may include special request insurer exposure reports based on insurer selected spatial data—e.g., the historical hurricane track for Andrew. These are major catastrophic event reports that provide an aggregation of total risk for a portfolio based on data loaded into the system representing a single major event. The event could be a major water surge, a terror act, or any type of catastrophe that is not available through the periodic updates provided by the weather service. The source and the structure of this data are disparate. The data for all events must share the characteristic that each record contains single polygon geometry and associated attributes.

The system's real-time and major catastrophe reports have the same type of output. The resulting report will contain grid results listing the portfolio sites within the event footprint and any exposure metric chosen in the report (TIV, limit, premium, deductible, etc.), as well as a map image of the affected area thematically shaded by exposure metric.

Multiple types of reports can be automatically generated either from a real-time data feed, generated by insurer or provided data on ad hoc/by request basis. The real-time based reports may have extended functionality to allow for additional data sources to be included with the real-time feed.

BRIEF DESCRIPTION OF THE FIGURES

For the purpose of facilitating an understanding of the invention, there is illustrated in the accompanying drawings an embodiment thereof, from an inspection of which, when considered in connection with the following description, the invention, its construction and operation, and many of its advantages should be readily understood and appreciated.

DETAILED DESCRIPTION

Figure 1:
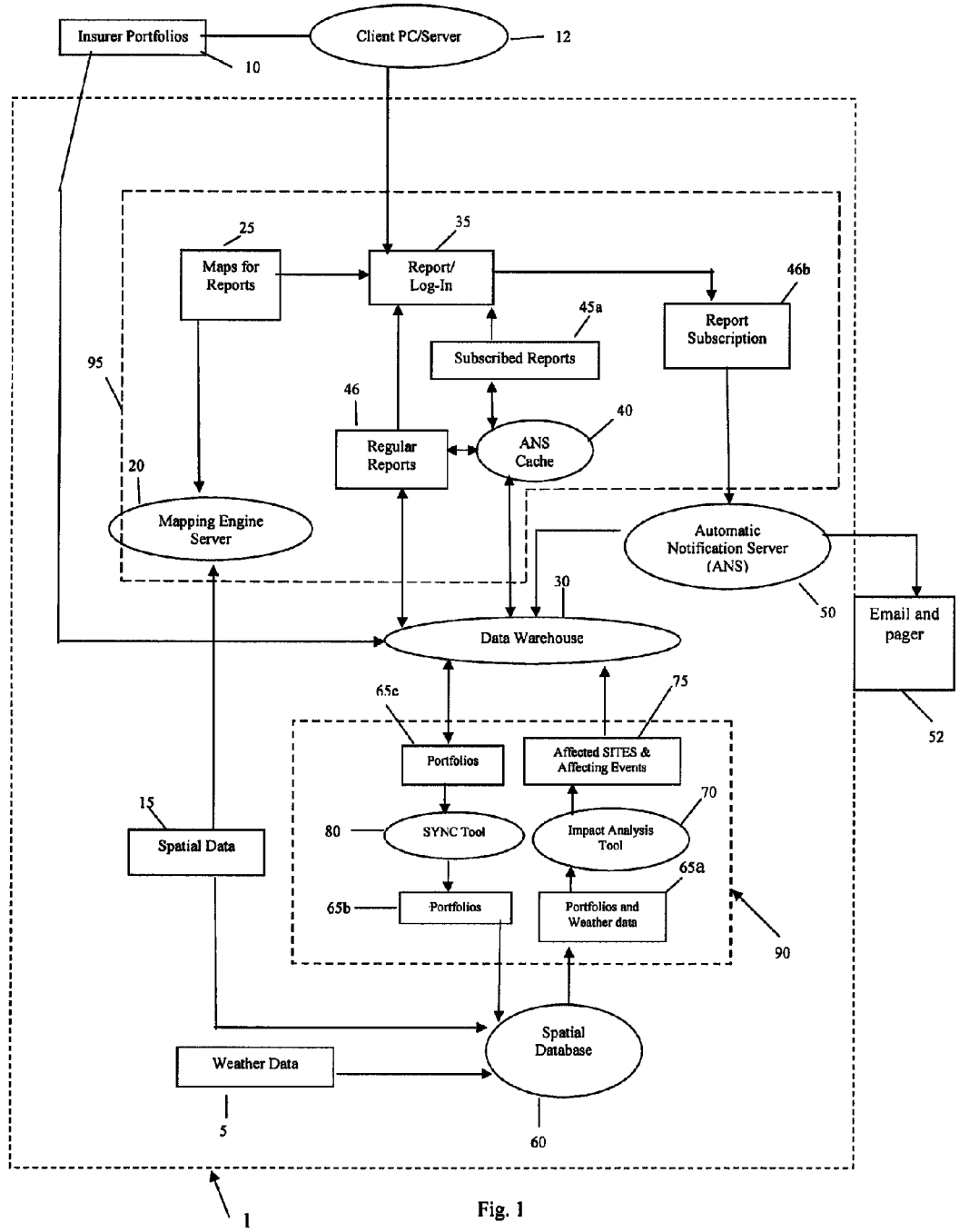
FIG. 1 is a flow chart depicting the application architecture for the present invention.
Figure 2:
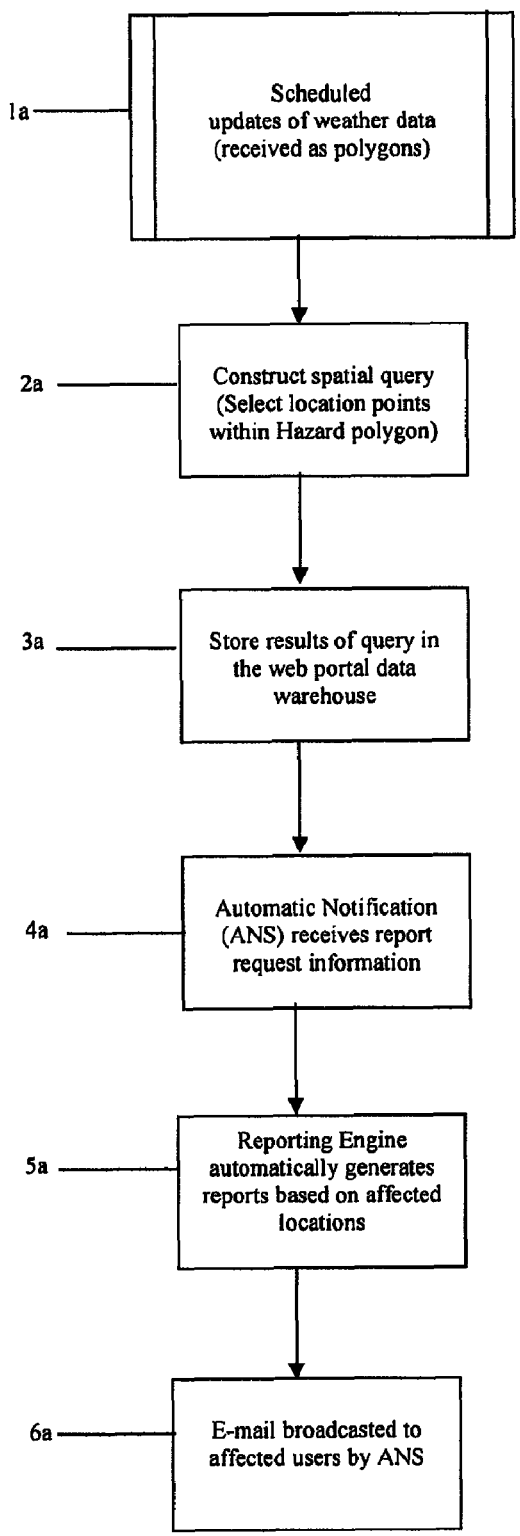
FIG. 2 is a flow chart describing a method of performing an embodiment of the present invention.

In an embodiment, the weather event and risk report system 1, as shown in FIGS. 1-11, can process and analyze weather data and manmade event data (collectively boundary data) and insurer portfolio data and integrate such data to provide reports. The weather data can include meteorological data. Manmade data can include newswire events including fires and terrorist attacks. The insurer portfolio data can include insurance data, such as insured properties and other financial information and insurance metrics. The reports generated by the system can include charts and graphical representations, such as maps. An overview of the system is depicted in FIGS. 1 and 2 as follows. FIG. 1 is a flow chart depicting the application architecture for the present invention, and FIG. 2 is a flow chart describing a method of performing an embodiment of the present invention. An embodiment of the present invention will be described with respect to FIGS. 1 and 2 as follows.

The system 1 can analyze the following weather (meteorological and catastrophic) events, including tornados, hail, wind gusts, wildfires, earthquakes, and hurricanes. The system may also be used to analyze other catastrophic events, such as major water surge, or manmade acts such as fires or terrorist acts and other perils. The system may analyze any events that are available on a newswire link. In an embodiment, technology used in the system 1 may include computer-readable signal-bearing medium, such as a mapping engine server 20, a data warehouse 30, an automatic notification server (ANS) cache 40, an ANS 50, a spatial database 60, an impact analysis tool 70 and a synchronization (SYNC) tool 80 each having logic medium including software, integrated circuits/processor or other hardware. The system may include a receiving circuit, a transmitting circuit, a selection circuit and a display circuit all provided by an end user device 52. In an embodiment, the system may use an Oracle Spatial Database, a Netezza Corporation NPS® Data Warehouse, a MicroStrategy Corporation Business Intelligence Reporting Engine, a MicroStrategy Corporation Narrowcast automatic notification server (ANS), a MapInfo Corporation MapExtreme Server mapping engine, an impact analysis application tool (for example, a Java application), a database synchronization tool (for example, a Java application), or a Sunopsis, Inc. ETL orchestration tool.

Major steps of accomplishing the present method as depicted in FIG. 2 may include:

1a. Feeding weather data into the spatial database tables that are converted to polygons by an impact tool on a scheduled basis;

2a. Constructing a spatial query by selecting location points correlated to the insurer portfolio data that had been loaded into a data warehouse and the spatial database and locating the points within a hazard or weather event polygon;

3a. Storing results of the spatial query in the data warehouse of the website portal;

4a. Periodic running of the ANS to allow it to receive report request information and send notifications;

5a. Automatically generating reports through the reporting engine of the system based on insurer portfolio data locations that are affected by the weather events; and 6a. Accessing reports on the web portal or via email broadcasted to affected users that have selected such reports.

A more detailed description of the steps of the present system are described with respect to FIG. 1. The orchestration tool 85 receives new data from a weather service 5, via the spatial database 60 and initiates the analysis and impact processes. The orchestration tool 90 can also output text and load data back to the tables of the data warehouse 30 and provide synchronization with the data warehouse 30. In an embodiment, the orchestration tool 85 can provide email notification to IT department for status updates including failures. The impact analysis tool 70 determines which insurer sites 75 are affected by polygons 65a (described below).

The impact analysis tool 70 can interrelate insured data 65b with weather data 65a received from the spatial database 60 by analyzing given insurer portfolio data points located within polygons representative of weather or manmade events. A polygon is boundary information for a geometric representation of boundary data such as a weather event that is generated by the weather service 5 or manmade event from a newswire link that is adapted by the spatial database 60. A polygon may have a boundary or perimeter of any geometric shape and includes shapes having more than four sides or having no sides e.g. oval or circle. The size of polygons may vary based on the particular weather event (e.g. bigger polygon for hurricane or a smaller polygon for a wildfire). Polygon boundaries and portfolio data points are correlated according to latitude and longitude data by the spatial database 60. Use of earth longitude and latitude, which could be viewed as two dimensional grid with latitude as the x-coordinate and longitude as the y-coordinate, is used as a relative data reference for integrating the portfolio data and weather data.

Insurer portfolio data 10 is input by a user 12. The portfolio data may include insurance data, such as an address of an insured property which is loaded into the data warehouse 30. Using geocoding (latitude and longitude) the address for each insured property is found by the mapping engine 20. In other embodiments, other data can be mapped also. The mapping engine 20 then provides corresponding data points and develops spatial data 15 that is synchronized with the spatial database 60 and data warehouse 30. Next the impact tool 70 and the ANS 50 are run to compare latitude and longitude data 65a,b,c, 75 (sometimes for up to six hours) in order to develop an imaginary boundary formed by three vertices to make a polygon. Then the feature ID 65a for each polygon is matched to each data point 65c and assigned a policy site ID. Then the affected site data 75 is pushed back to the data warehouse 30 and, finally, back to the reporting engine 95.

A user 12 selects threshold values, for example by choosing a beginning date for the weather event and enters them into the website portal 35. The reporting engine 95 then runs a report from any one of the map reports 25, ANS reports 35, the ANS cache 40, subscribed reports 45, regular reports 46 or report subscriptions 47. The report can identify the geographic areas affected by the selected weather event. Results are shown as a grid and use the map exchange server 20 to get the feature ID (polygon) from the data warehouse 30 in order to query the spatial database 60 via the orchestration tool 90 and displays the map 25 to the user. The user can adjust the resolution of the map for different events. For example, if viewing a tornado (see FIGS. 8, 9), since it is a small event, the user might zoom-in from an entire U.S. map view to a state or county view. For a larger weather event, such as a hurricane (see FIGS. 10, 11), a large area or regional view can be selected. A user can convert the graphical map to satellite imagery via the mapping engine 20. The user can also choose many other features and layers to be displayed including major highways, cities and site numbers to add to the maps using the features of the mapping engine 20.

The automatic notification server (ANS) 50 connects to the portal page 35 and when a user subscribes to a report 45, the reporting system 95 can implement the ANS 50 to run a nightly report to obtain the requested data. The ANS 50 can deliver the report by email or to an end user device such as a Personal Digital Assistant, cellular phone, computer and/or printer or pager 52 such as via the interne or to the insurer's PC 12 (which may also be an end user device) or may generate a cache (Cube) 40 that includes the subscribed report 45 (usually from midnight to 7:00 am.). When a user 12 logs into the portal 35 and selects "run report" the ANS 50 checks for the cache 40 (instead of running the report) and delivers the report 45 to the user 12, 52. It is to be understood that use of the cache 40 to deliver the report 45 is much quicker than running the report anew each time the user queries the reporting engine 95. In an embodiment, the system provides for integration of the mapping engine 20 and reporting engine 95 with unique drivers. Such integration provides quicker results and avoids open source processing which may be much slower.

The insurer 12 provides its portfolio 10 to the host website in various formats, such as flat files, Excel, SQL server database etc. The host website cleans, transforms and loads data into the data warehouse 30. The present invention can process many types of portfolio data having many thousands of fields, tables or other data types. For example, insurance portfolio data can be processed including insured information such as name, address, social security numbers, phone numbers, insured property data including address, insured value, actual value or rider values, and policy information including expiration dates, policy limits, etc. Next, insurer portfolio sites 10 are loaded from the data warehouse 30 into the spatial database 60 via the orchestration tool 90. Longitude and latitude data is used by the SYNC tool 80 in order to represent the portfolio site data 65c. By using synchronization tool 80, a java application, spatial points are constructed by using longitude and latitude for all portfolios 65c. Then the portfolio site information 65b along with newly created spatial points are loaded into the spatial database 60. Next, weather data 5 is loaded into the spatial database tables 60. In an embodiment, a weather service server 5, for example from Harvard Design & Mapping, may provide weather related data, such as severe history (tornado, hail and wind gust), earthquakes, wildfires, hurricanes, and precipitation data in a geospatial form. The weather service 5 collects weather data from various locations and transforms it into polygons. All the weather data 5 is pushed into tables of the spatial database 60 on a periodic or real-time basis.

Next, the impact tool 70 is run (e.g., nightly) to find which sites 75 are affected by each weather event 65a. In the spatial database 60, each point represents a portfolio site 65b and each polygon represents a weather related event 65a. When a point is found inside or on the boundary of a polygon, it means that such site is affected by that weather event. This logic is implemented by the impact tool 70, that may be a java application, which finds all the points that are falling within a polygon by using spatial database queries. Affected sites and events 75 are then loaded into the data warehouse 30. In an embodiment, a synchronization tool 80 may be run every week and the impact tool 70 for each weather event 5 may be run every night.

In the next step, a insurer 12 logs onto the host web portal 35 in order to access the system 1 and runs the reporting engine 95. The reporting engine 95 connects to the data warehouse 30 to display the affected sites 75 and provides the TIV in a grid, map or chart (see FIGS. 3-11). If the user 12 chooses to view the map of the affected areas, then the reporting engine 95 requests a mapping server 20 to get a map by providing the unique feature grids of the weather event and portfolio sites stoked as a shape file in the spatial database 60. The map server 20 then connects to the spatial database 60 to get the spatial information and then generates maps. Once a map is ready, it passes it to the reporting engine 95 to display the maps in the reports.

The weather service 5 may collect spatial data including wildfire data from MODIS, which are essentially longitude and latitude of the location, and generates a circle of 1 kilometer radius around the centroid of the wildfire. Any point that falls within the wildfire circle has the potential risk exposed to that event.

The weather service 5 can collect data for tornados, hail and wind gust data from various sources and construct polygons. Any point that falls within a severe weather polygon has the potential risk exposed to that event. The weather service can collect earthquake information around the world from many sources and the system constructs polygons around the point data based on an algorithm as follows:

The weather service 5 provides three types of hurricane data: 1) hurricane tracks; 2) hurricane windarea; and 3) hurricane windpath. The system tracks data and tracks the eye of the hurricane at a point at a given time. Windarea data consists of average wind speeds of 34 knots, 50 knots, 64 knots and 100 knots observed at South East, South West, North East and North West. Using an algorithm, the weather service constructs a polygon joining these points for each speed band. Reports are generated so that a insurer can know the exposure at each level of 34, 50, 64 and 100 knots average wind speeds.

The weather service 5 also provides windpath data which is same as windarea except it reports maximum wind speeds, instead of average wind speeds. Historical, current and forecast data for each category is provided by the weather service 5. Forecast data plays an important role when insurers want to see exposure by a hurricane event. A lot of complicated analysis can be eliminated by using rich geometry features of the spatial database 60, which essentially finds a point in a polygon. The system can be automated via the ANS 50 so that as soon as any weather related data is available, analysis initiates and the results are stored. A insurer 12 can use standard reporting interfaces through a web browser and view the exposure data from the portal 35 of the system 1. The insurer 12 may export the results to Excel or other formats and can do further analysis. By binding maps to the exposure, a insurer can view the actual map of the exposure. When predetermined threshold values are set, a insurer can get automated notifications via the ANS 50 when its exposure by any weather related event exceeds the pre-set threshold value, such as the TIV in the coming days.

Figure 3:
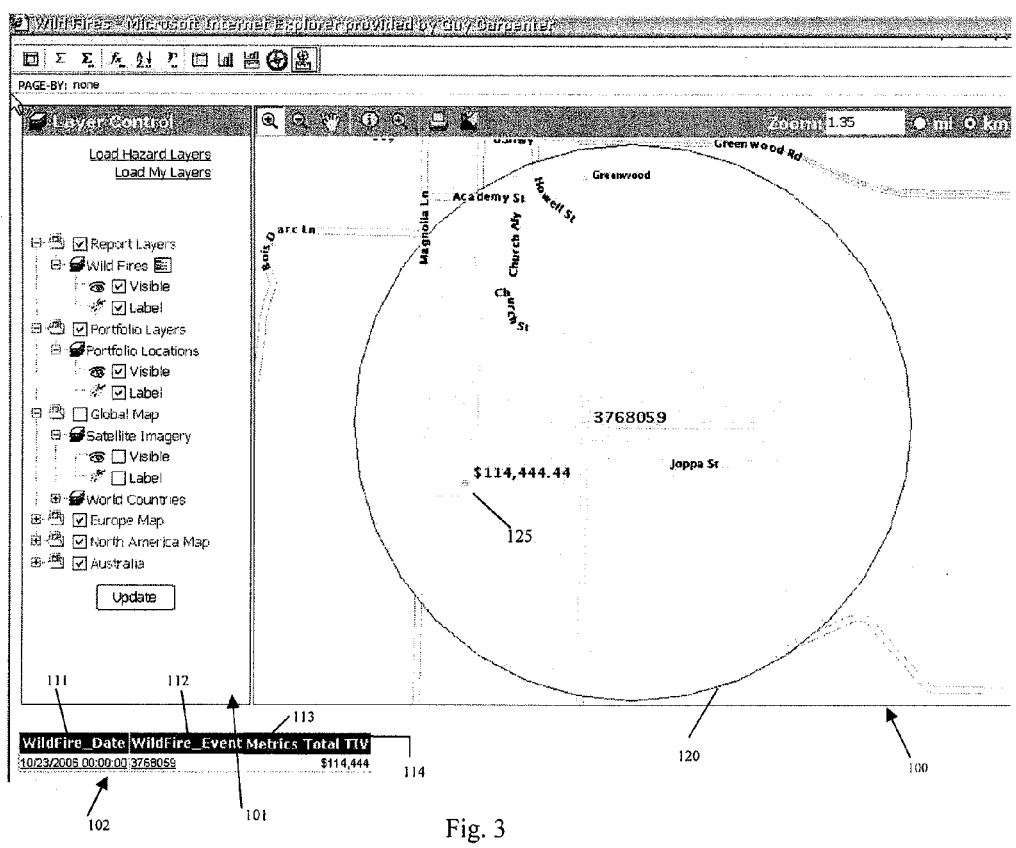
FIG. 3 is a screen-shot of a map generated for an embodiment of the present invention depicting wildfire data without satellite imagery and with site locations.

Turning to FIGS. 3-11, the present invention will be described with respect to specific embodiments. In particular, screen shots from reports produced by the reporting engine 95 including mapped weather data and points affected by the weather data will be discussed. Turning to FIG. 3, a screen shot of a map is depicted showing wild fire data with site locations. The screen shot includes a map area 100, layer control area 101 and chart 102. The map area 100 is a graphical representation of the data provided in the chart 102.

Column 111 of the chart includes the weather data obtained from the spatial database, based on the threshold values inserted by the user. In this example, the weather data is wild fire data and the data requested was for wild fires occurring on Oct. 23, 2006 at 0000 hours (midnight). Column 112 identifies the specific weather event tracked and received based on weather service data. In this embodiment, column 112 includes a feature ID number 3768059 which identifies a specific wildfire matching the threshold parameters selected by the user.

The ANS uses the feature ID number to track the weather event. The third column 113 is for additional metrics related to the weather related event. In this figure, such metrics have not been included. Column 114 is the TIV for the properties affected with respect to the weather event, in this case the wild fire. In this example, a single property identified with a point on the map has a TIV of $114,444.44. The data for this single property is received by the data warehouse 30 which stores the insurer portfolio data including such properties. The impact analysis tool 70 uses the weather data and the spatial database to determine that this property is within the polygon 120 by locating the data point 125 within the polygon 120. In this embodiment, the polygon is a circle, but many other shaped polygons may be depicted, as will be discussed in detail below.

Each property from the insurer portfolio data is assigned a policy site ID number and is tracked by the system 1 according to the policy site ID number. In the case of the map displayed in FIG. 3, the policy ID site number may be displayed (not shown). As shown in FIG. 3, the TIV is displayed for the data point 125. However, it can be seen that in the map area 100, the feature ID number related to the wild fire number 3768059 is displayed in the middle of the polygon 120. It is to be understood that this map is of a relatively small area in that the wild fire covers a relatively small geographic area. Therefore, the map depicts individual street names as it is enlarged to depict a 1.35 kilometer range, as shown at the top of the map.

The layer control area 101 of this screen shot depicts different options available for modifying the graphical representation of the map area 100. Different hazard layers and load layers may be depicted in this view. As well, different report layers, such as wild fire, visible and label layers may be depicted. Portfolio locations may be either visible or labeled by checking the radio buttons. A global map may be depicted. Further, a satellite view may be checked with the radio boxes to be visible and labeled. Countries may be identified globally. Additionally, Europe, North America and Australia maps may be depicted by clicking on specific radio buttons.

Figure 4:
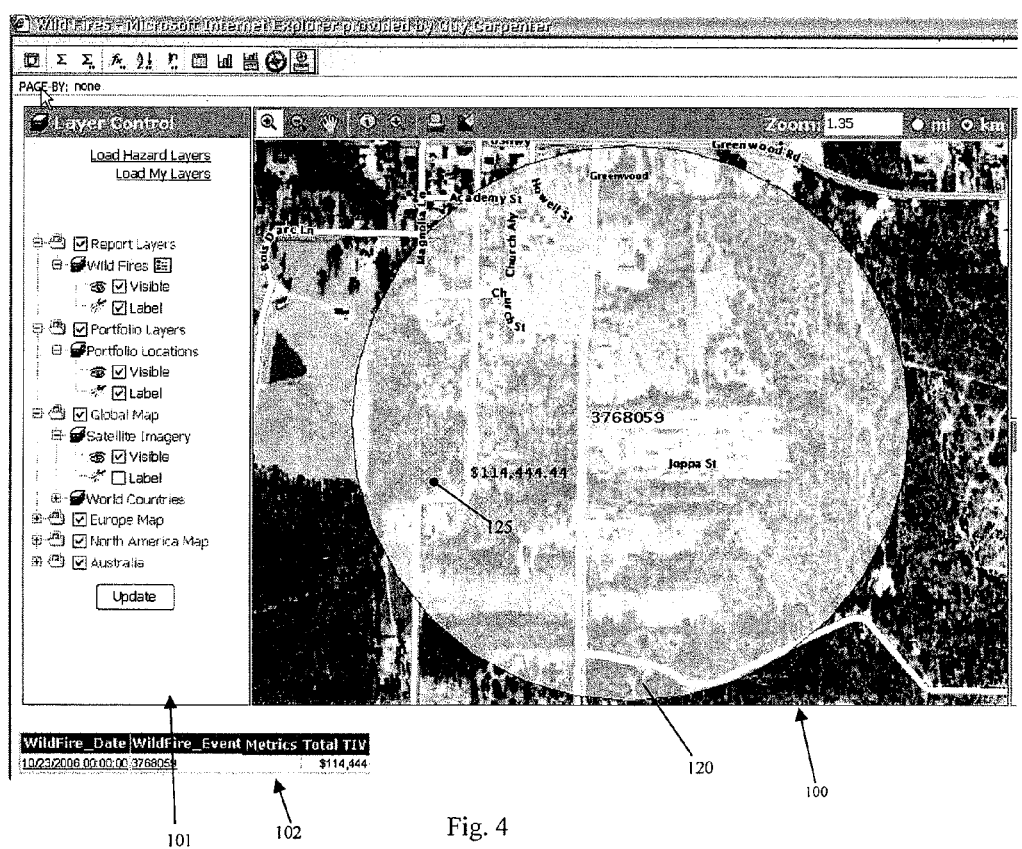
FIG. 4 is a screen-shot of a map generated for an embodiment of the present invention depicting wildfire data with satellite imagery and site locations.

FIG. 3 depicts the satellite imagery with the visible button unchecked. Therefore, FIG. 3 does not depict satellite imagery. Turning to FIG. 4, it can be seen that in the layer control area 101, the satellite imagery box for "visible" is checked. In the map area 100 it can be seen that the satellite imagery is depicted and actual photographic views of the geography is displayed. It is understood that the same labels and visible portfolio locations of the wildfire depictions from FIG. 3 are also displayed in FIG. 4.

Figure 5:
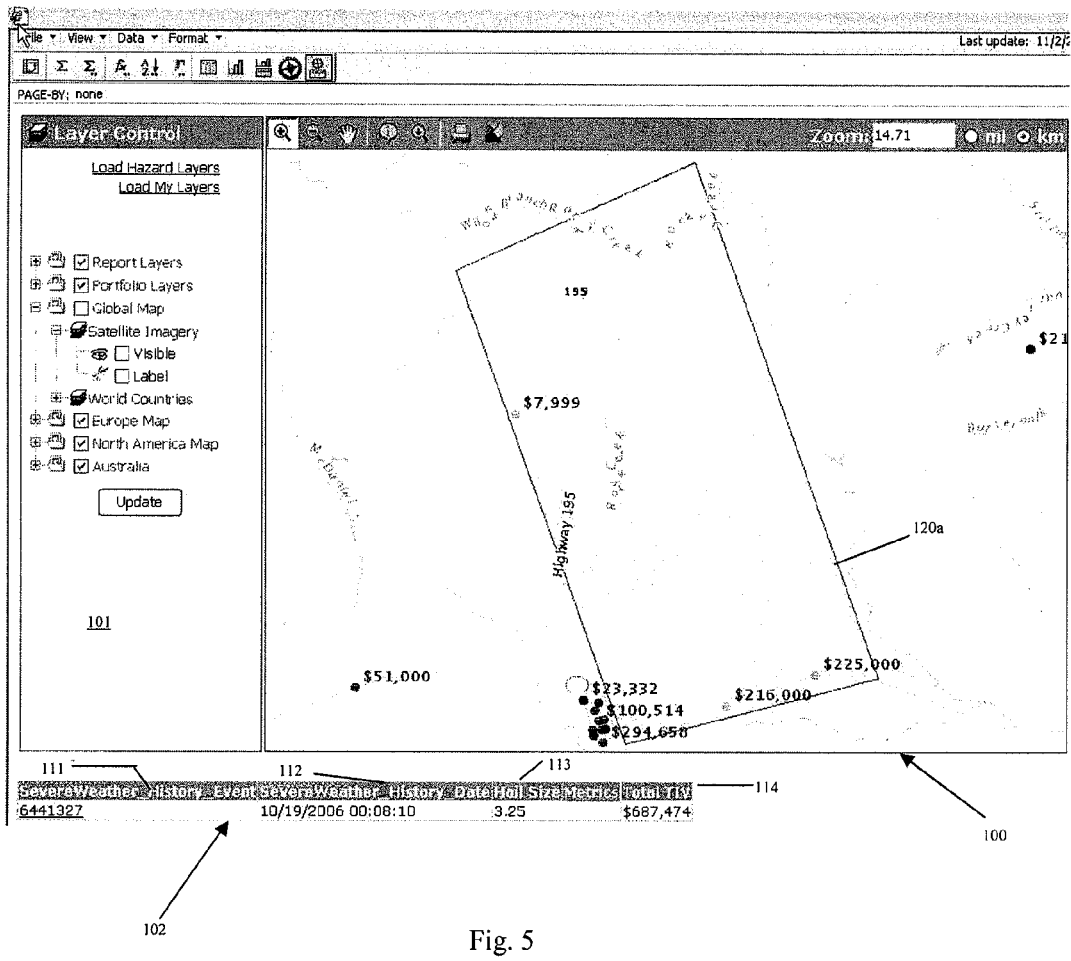
FIG. 5 is a screen-shot of a map generated for an embodiment of the present invention depicting hail data without satellite imagery and with site locations.
Figure 6:
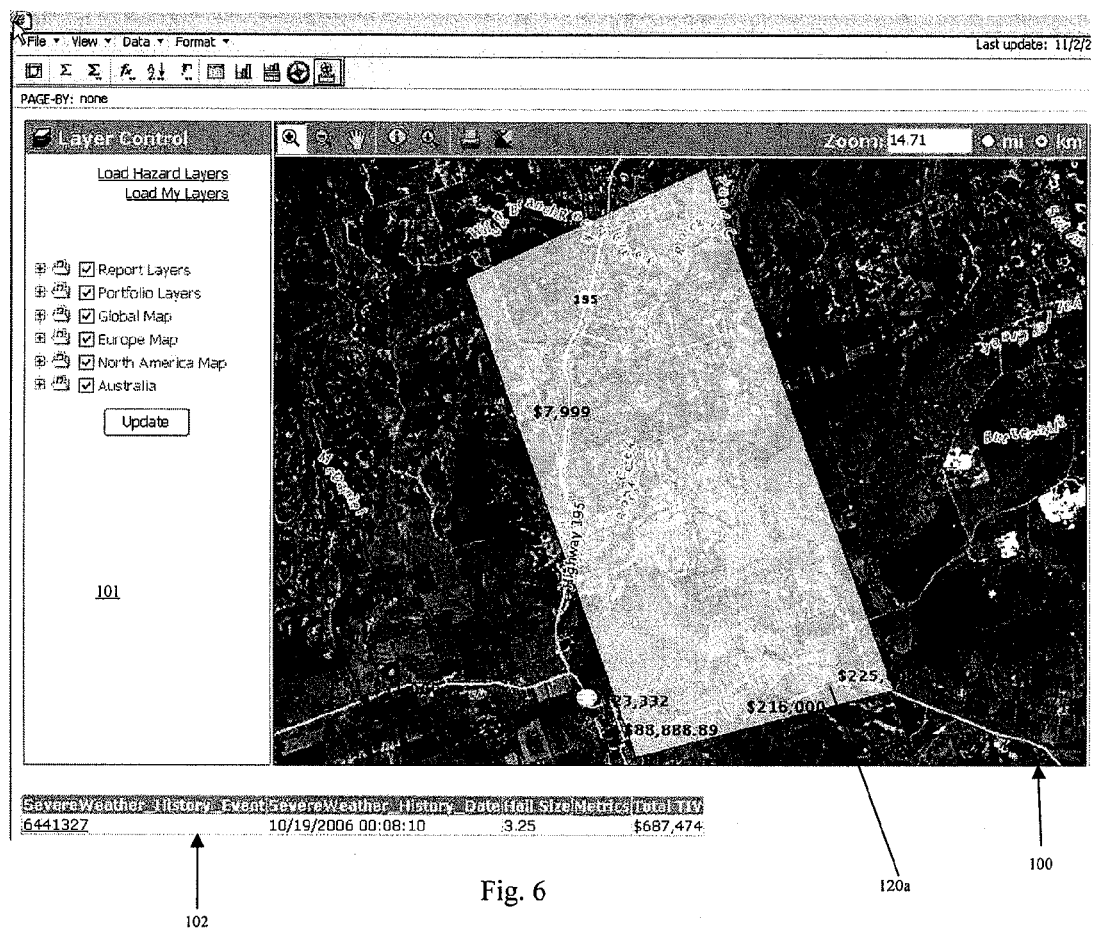
FIG. 6 is a screen-shot of a map generated for an embodiment of the present invention depicting hail data with satellite imagery and site locations.

Turning to FIG. 5, a screen shot of a severe weather event with respect to hail data is depicted including site locations. It can be seen in map area 100 of FIG. 5 that a map is depicted having a polygon 120a. Located within the polygon 120a are points representing insured properties that represent the input insurer portfolio data from the data warehouse. In the chart 102, the first column 111 depicts the severe weather history for the hail storm which is identified as feature ID number 6441327 and is identified in the second column 112 according to the threshold value selected by the user of a weather event occurring on Oct. 19, 2006 at 00 hours, 8 minutes and 10 seconds. In addition, column 113 depicts the hail size of 3.25 inches. This is an additional threshold value that can be adjusted by the user of the system in order to match related weather data from the weather reporting system. This data is searched by the ANS in order to obtain a polygon 120a from the mapping engine and to identify which points based on the insurer portfolio data are within the polygon 120a. The orchestration tool 90 can calculate a TIV (as shown in the fourth column 114) of $687,474 that is affected by this weather event. (In the embodiment shown, not all of the points that match or are located within the polygon 120a are depicted and therefore the individual dollar values for each property point shown in the map area 100 will not add up to the TIV of column 114.) Turning to FIG. 6, the same image of FIG. 5 is depicted but using a satellite image layered with the polygon 120a. As shown at the top of the map area 100 in FIGS. 5 and 6, the zoom is set at 14.71 kilometers in order to zoom in on this particular polygon 120a.

Figure 7:
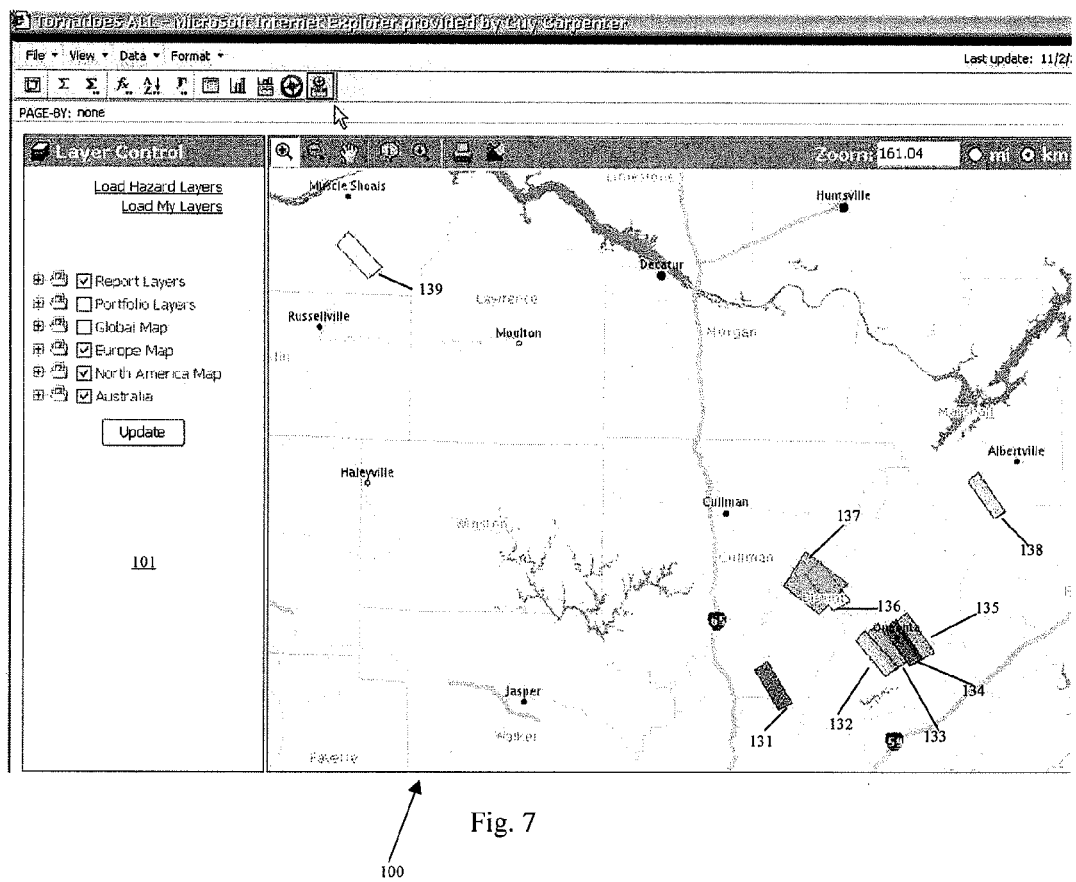
FIG. 7 is a screen-shot of a map generated for an embodiment of the present invention depicting tornado data without satellite imagery and without site locations.
Figure 8:
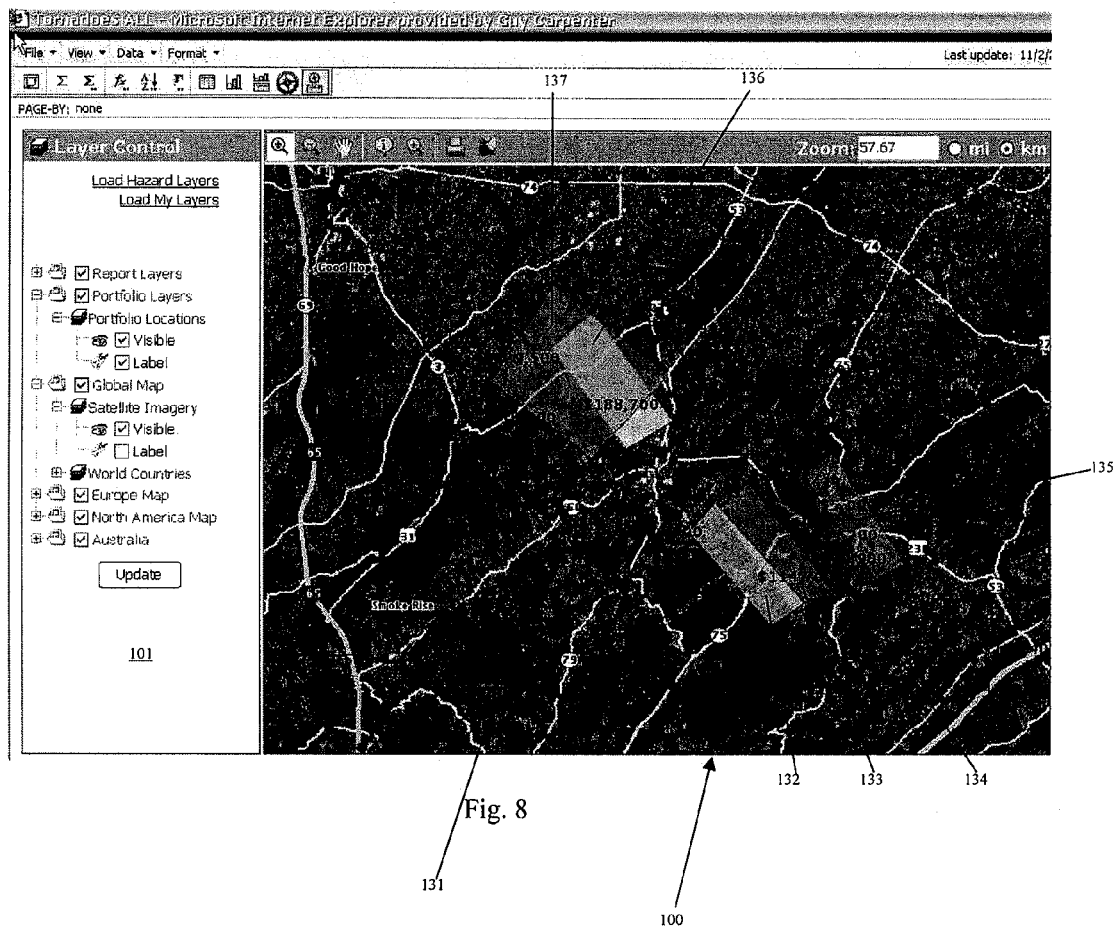
FIG. 8 is a screen-shot of a map generated for an embodiment of the present invention depicting tornado data with site locations and satellite imagery.

Turning to FIG. 7, a screen shot is depicted showing tornado data. The map area 100 depicts polygons 131-139. In the view of the map area 100, the report layers identifying the insurer portfolio insurance data are not depicted in this view. As this view is zoomed out to a relatively large area of 161.04 kilometers, it is not useful to depict the points within the polygons. Turning to FIG. 8, a view similar to that in FIG. 7 of a screen shot is shown that is zoomed in to 57.67 kilometers that also includes site location and satellite imagery. It can be seen in the layer control area 101 that the radio buttons for satellite imagery have been checked and also for the portfolio locations to be visible and labeled are checked. Thus, in the map area 100 of FIG. 8 the polygons 131-137 are depicted. The other polygons 138 and 139 depicted in FIG. 7 are not displayed in the map area 100 of FIG. 8, as this view has been zoomed in to depict a smaller area. As shown in the map area 100 of FIG. 8, the insured value of each individual property location point located within the polygons 131-137 are depicted (as well as points outside of the polygons). Although not depicted in FIG. 7 or 8, a TIV for the points identified by the ANS 50 that are affected by this tornado can be displayed in a chart when selected by the user and the report is generated.

Figure 9:
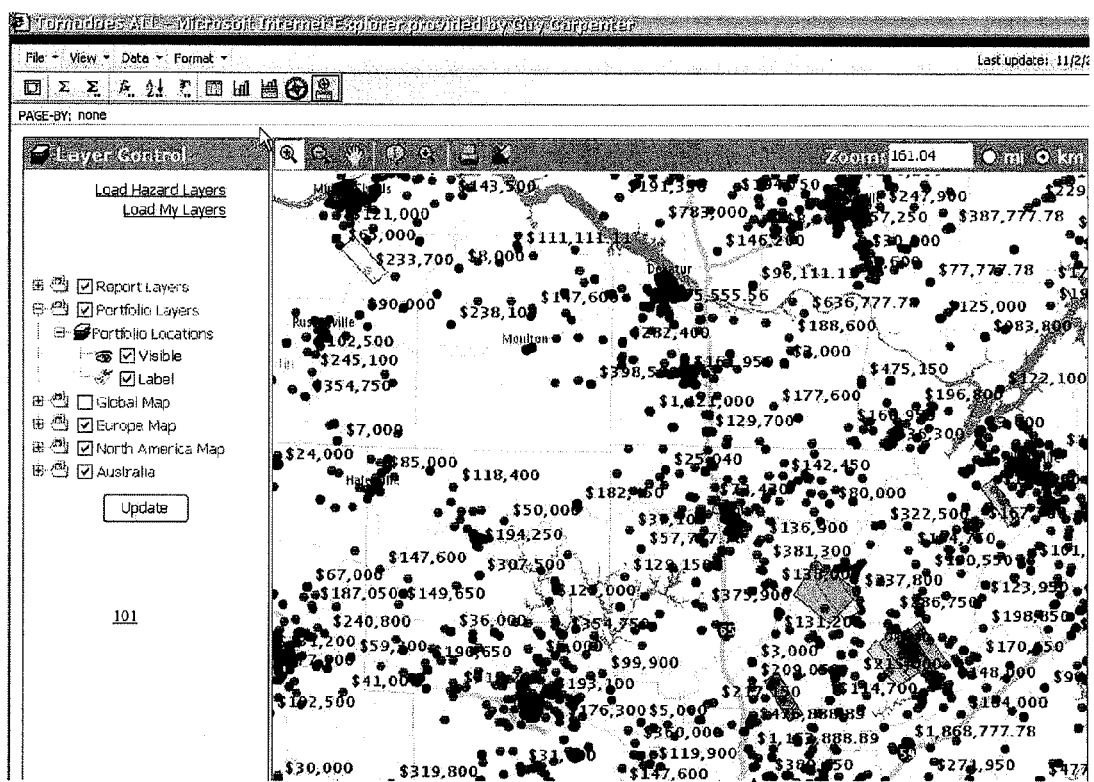
FIG. 9 is a screen-shot of a map generated for an embodiment of the present invention depicting tornado data without satellite imagery and with site locations.

Turning to FIG. 9, a view similar to FIG. 7 is depicted. However, it also includes the insurer portfolio insurance data for this segment of the map. As can be seen in layer control area 101, the portfolio location radio buttons for visible and label have been checked and in the map area 100, points are shown on the map where insured properties are located. As well, the map depicts the same polygons as depicted in FIG. 7. These polygons 131-139 (see FIG. 7) are in the same relative locations as the zoom for the map area 100 of FIG. 9, which is set at 161.04 kilometers (which is the same as in FIG. 7).

Figure 10:
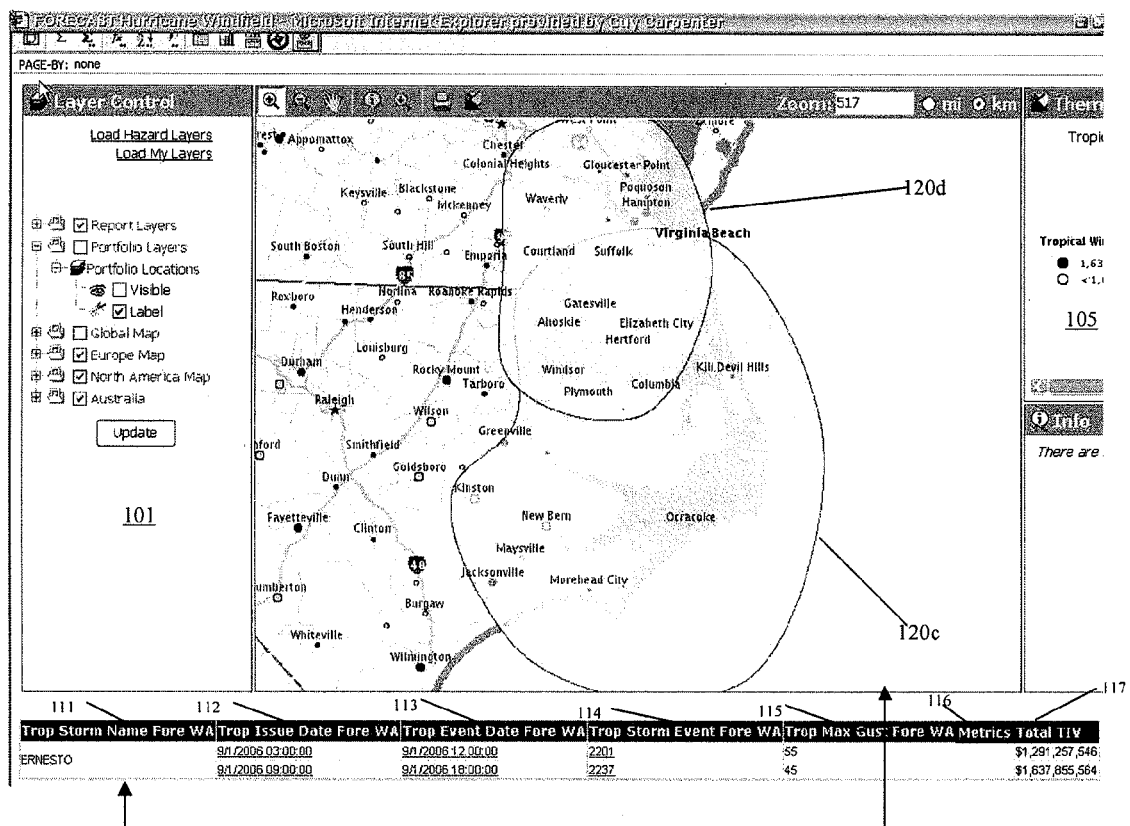
FIG. 10 is a screen-shot of a map generated for an embodiment of the present invention depicting hurricane data without site locations.
Figure 11:
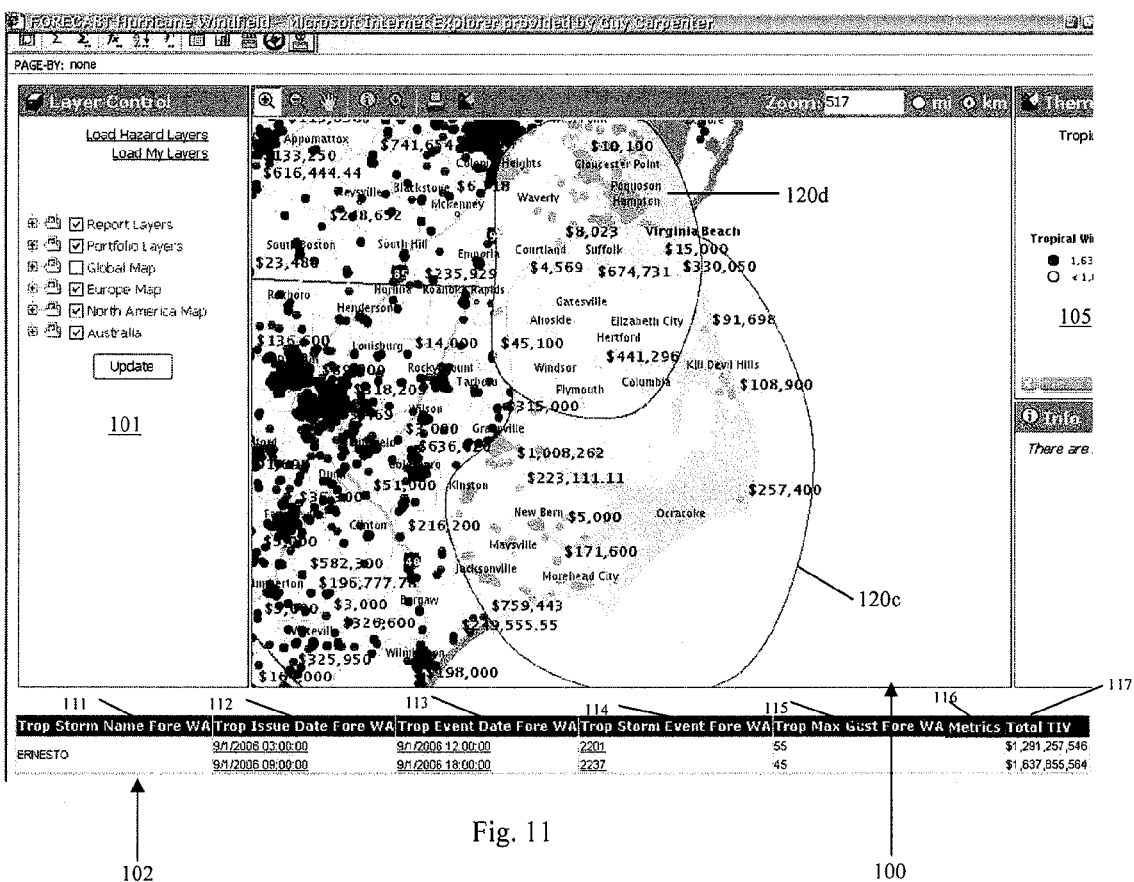
FIG. 11 is a screen-shot of a map generated for an embodiment of the present invention depicting hurricane data with site locations.

FIGS. 10 and 11 depict hurricane Ernesto and the affected properties taken from insurer portfolio data. FIG. 10 is the graphical representation of the report depicting polygons 120c, representative of hurricane Ernesto, and FIG. 11 is the same report including portfolio data points as visible. The chart 102 depicts the threshold value information selected by the user/insurer from the portal website 35 that was used by the system 1 to generate the reports as depicted in FIGS. 10 and 11. The chart 102 in the first column 111 depicts the Tropical Storm Name Forecast Warning Data and the second column 112 depicts the Tropical Issue Date Forecast Warning data for Ernesto on Sep. 1, 2006, at 0300 hours (3:00 am). This data correlates with the polygon 120c which shows the approximate outline of the hurricane area at the specified time. The polygon 120d depicts the hurricane the same day but at 0900 hours (9:00 am). Thus, the map area 100 depicts the hurricane's change in location over a 6 hour period. The third column 113 depicts the Tropical Event Date Forecast Warning Data for these time periods.

For FIGS. 10 and 11, the chart 102 shows in the fourth column 114 the Tropical Storm Event Forecast Warning Feature ID number of 2201 for the 3:00 am position of Ernesto and Feature ID number of 2337 for the 9:00 am position of Ernesto. Other threshold values have been selected including at the fifth column 115 the Tropical Maximum Gust Forecast of 55 mph for the 3:00 am position and 45 mph for the 9:00 am position. Other Metrics can be chosen and depicted in the sixth column 116 (none shown in FIG. 10 or 11). Finally, for each period selected, the TIV is depicted in the seventh column 117. As shown in FIG. 11 on the map area 100, individual points correlating to the insured properties identified in the insurer portfolio data obtained from the data warehouse 30 are depicted. The spatial database 60 determines the total number of points located within the polygon 120c and the reporting engine 95 calculates a TIV of $1.291 billion. For the polygon 120d a TIV of $1.637 billion is depicted.

The report as shown in FIGS. 10 and 11 also includes a "Key" area 105 that provides a key for the colors of the points to show increasing values according to the insurer portfolio data. It is to be understood that many other types of reports with varying combinations of data can be chosen by the user. For example, a hurricane path view may be provided to show all properties included in the insurer portfolio data that are in the path of the storm. Of course, all reports will vary according to the particular threshold values selected by the user for each particular weather event including earthquakes. The above described screen shots in FIGS. 3-11 are only examples of many of the types of reports that can be provided to the users of the system. Many other reports for many other types of weather events may be produced although such reports are not described above. Such reports may be produced for man-made events such as fires or terrorist attacks as well.

Thus, it can be understood that a user of the system can quickly and easily identify where its insured properties are and what the TIV is for a multiple of weather related events. The flexibility of the system to provide maps that can be zoomed in and zoomed out and that can be layered in multiple fashions allows for the quick comprehension of the data and for insurance companies to prepare actuarial analyses and understand their exposure very quickly. It is also understood that these maps can be generated in very short times due to the system's integration of the spatial database, data warehouse, automatic notification server, orchestration tool, mapping engine or the reporting engine. Such integration of some of these components together allow for the collection of real-time weather data to be correlated with the insurer portfolio data in order to generate these reports and maps rapidly. As well, it is to be understood that the users of the system may select from many threshold values, including data range, weather event, geographic area, TIV range, property value or other metrics, in order to pinpoint the types of damage and exposure about which such users may be concerned with respect to certain types of insurance policies they have written or acquired and desire to analyze. Thus, it is to be understood that an insurance company using this system need not wait for claims to be filed by individual policyholders in order to begin determining their TIV. By use of the present system, within minutes after the occurrence of the weather related or meteorological event, the TIV can be determined with greater accuracy. It is also to be understood the portfolio data may be data for clients other than insurers, such as governments, state and federal agencies and other private firms who need risk data combined with real-time meteorological data.

While particular embodiments have been shown and described, it will be apparent to those skilled in the art that changes and modifications may be made without departing from the principles of the invention in its broader aspects. Details set forth in the foregoing description and accompanying drawings are offered by way of illustration only and not as a limitation. The actual scope of the present invention is intended to be defined in the following claims when viewed in their proper perspective based on the prior art.

What is claimed is:

1. A method of generating integrated data reports, comprising:
    (a) storing, into a computer, insurer portfolio data comprising a plurality of geographic locations within a geographic area, wherein insurance coverage is provided by the insurer in said geographic location;
    (b) storing, into the computer, one or more user risk thresholds for the insurer portfolio; (c) receiving, by the computer, real time data including weather;
    (d) determining, with the computer, the effects of the real time data on said insurer portfolio data plurality of geographic locations;
    (e) selecting, with the computer, a subset of said geographic locations wherein the corresponding effect of the real time data exceeds at least one of the one or more user risk thresholds;
    (f) determining a level of monetary exposure based on the effects of the real time data on said insurer portfolio data plurality of geographic locations, the level of exposure being capable of expression as a monetary value; and
    (g) providing, by the computer, a report specifying the level of monetary exposure or the subset of said geographic locations.

2. The method of claim 1 wherein the step of providing a report includes generating, with a spatial database, polygons representative of weather event data boundary information and newswire event data.

3. The method of claim 2 further including the step of processing, in the computer, the insurer portfolio data geographic locations and the polygons, and the step of determining whether and which insurer portfolio data geographic locations fall within or on the boundary of the polygons.

4. The method of claim 3 wherein the step of determining whether and which insurer portfolio data geographic locations fall within or on the boundary of the polygons includes implementing a software application programmed in Java programming language and using one or more spatial queries.

5. The method of claim 4 wherein the step of using one or more spatial queries includes correlating latitude and longitude of said geographic locations with latitude and longitude data for each polygon.

6. The method of claim 1 wherein said step of providing a report includes generating a map indicating the subset of said geographic locations.

7. The method of claim 1 wherein the step of providing a report includes providing the report to a user via an internet web portal.

8. The method of claim 1 wherein the step of storing insurer portfolio data includes loading, by an insurer, said insurer portfolio data via a web portal.

9. The method of claim 1 wherein the method further comprises the steps of: retrieving the insurer portfolio data from a data warehouse; connecting the data warehouse to a reporting engine; and displaying in a grid, in the report, affected sites and insurance metrics.

10. The method of claim 1 wherein the step of providing a report includes generating the report overnight for the insurer and storing the results as a cache file.

11. The method of claim 1 wherein the step of providing a report includes logging in, by a user, to the computer, and providing the report to a desktop of the insurer.

12. The method of claim 1 wherein the real time data includes tornado, hail, wind gust, earthquakes, wildfires, hurricanes, precipitation, water surge, fire, or terrorist attack data in a geospatial form.

13. The method of claim 1 wherein the real time data is collected from various locations and the real time data is transformed into polygons and points on a map depicted in the report.

14. The method of claim 1 wherein the subset of said geographic locations include risk areas of claim loss.

15. A system for generating integrated data reports, comprising:
- at least one memory device including a spatial database receiving and storing insurer portfolio data, said insurer portfolio data including insurance coverage with corresponding geographic locations within a geographic area, said spatial database further receiving and storing real time data including weather data;
- a central processing unit (CPU) for receiving said insurer portfolio data and said real time data, and for receiving one or more user risk thresholds for the insurer portfolio; and
- a communications connection port for providing a connection to the insurer, whereby the CPU determines the effects of the real time data on said plurality of geographic locations in said insurer portfolio data, the CPU compares the effects of the real time data to the user risk thresholds to select a subset of said plurality of geographic locations in which the corresponding effect of the real time data exceeds at least one of the one or more user risk thresholds, and whereby the system provides a report via the communications connection to the insurer, wherein the CPU determines a level of monetary exposure based on the effects of the real time data on said plurality of geographic locations in said insurer portfolio data, the level of exposure being capable of expression in terms of a currency and being associated with the subset of said geographic locations, the report specifying the level of monetary exposure or the subset of said geographic locations.

16. The system of claim 15 further including an automatic notification server (ANS), wherein the user risk thresholds includes one or more of a date range, weather event, geographic area, total insured value (TIV) range, or property value, the user risk thresholds being received by the ANS.

17. The system of claim 15 wherein the system includes a mapping engine for mapping the real time data.

18. The system of claim 15 wherein the real time data includes tornado, hail, wind, earthquake, water surge, wildfire, hurricane track, hurricane wind area, or hurricane wind path data, precipitation, fire, or terrorist attack data.

19. The system of claim 15 further including a data warehouse, wherein the insurer portfolio data is assigned a policy site ID number, a polygon is assigned a feature ID number, and both the policy site ID number and feature ID number are stored in the data warehouse.

20. The system of claim 15 wherein the insurer portfolio data includes insured dollar values for individual insured properties of the insurer portfolio data, and the report includes a display of the dollar values falling within a real time data boundary.

21. The system of claim 15 wherein the report includes a map indicating the subset of said geographic locations and a level of claim loss risk.

* * * * *

UNITED STATES PATENT AND TRADEMARK OFFICE Certificate

Patent No. 8,386,280 B2

Patented: February 26, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Shajy Mathai, Chester, NJ (US); Bryan Adams, Pompton Plains, NJ (US); Kiran Andaloo, Jersey City, NJ (US); Shaju Samuel, Paramus, NJ (US); and Elizabeth Soh, Leonia, NJ (US).

Signed and Sealed this Fourth Day of June 2013.

ROBERT MORGAN
*Supervisory Patent Examiner*
Art Unit 3626
Technology Center 3600